United States Patent
Slemon et al.

(10) Patent No.: US 9,134,181 B2
(45) Date of Patent: Sep. 15, 2015

(54) FLAME DETECTOR

(71) Applicants: Volution Inc., Encinitas, CA (US);
Thermo Pro Manufacturing, LLC, Gilmer, TX (US)

(72) Inventors: Charles Shafee Slemon, Encinitas, CA (US); Michael Shafee Slemon, Encinitas, CA (US); Charles Slemon, Pawtucket, RI (US); Dewey Barton Morris, Henderson, TX (US); John B. Walsh, Gilmer, TX (US)

(73) Assignees: VOLUTION INC., Encinitas, CA (US); THERMO PRO MANUFACTURING, LLC, Gilmer, TX (US)

(*) Notice: Subject to any disclaimer, the term of this patent is extended or adjusted under 35 U.S.C. 154(b) by 0 days.

(21) Appl. No.: 14/251,795

(22) Filed: Apr. 14, 2014

(65) Prior Publication Data
US 2014/0312240 A1    Oct. 23, 2014

Related U.S. Application Data

(60) Provisional application No. 61/813,591, filed on Apr. 18, 2013.

(51) Int. Cl.
| | |
|---|---|
| *G01J 5/18* | (2006.01) |
| *G01J 5/00* | (2006.01) |
| *G08B 17/12* | (2006.01) |
| *G08B 29/18* | (2006.01) |
| *G01J 1/02* | (2006.01) |
| *G01J 1/42* | (2006.01) |
| *G01J 5/08* | (2006.01) |

(52) U.S. Cl.
CPC ............ *G01J 5/0018* (2013.01); *G01J 1/0252* (2013.01); *G01J 1/429* (2013.01); *G08B 17/12* (2013.01); *G08B 29/183* (2013.01); *G01J 5/0846* (2013.01)

(58) Field of Classification Search
CPC .................................. G01J 5/00; G08B 17/12
See application file for complete search history.

(56) References Cited

U.S. PATENT DOCUMENTS

| | | | | |
|---|---|---|---|---|
| 4,815,840 A * | 3/1989 | Benayad-Cherif et al. | .. | 356/3.13 |
| 6,222,456 B1 * | 4/2001 | Tice | .............................. | 340/630 |
| 6,518,574 B1 * | 2/2003 | Castleman | ............... | 250/339.15 |
| 7,541,938 B1 * | 6/2009 | Engelhaupt | ................... | 340/578 |

* cited by examiner

*Primary Examiner* — David Porta
*Assistant Examiner* — Faye Boosalis
(74) *Attorney, Agent, or Firm* — Nydegger & Associates

(57) ABSTRACT

A system and method are disclosed for detecting open flames in an outdoor environment. Structurally, the outdoor flame detector includes both an ultra-violet (UV) detector and a Radio Frequency (RF) detector. While operating within predetermined parameters, these detectors respectively create an event signal(s) and a cancel signal(s). In detail, the UV detector will output an event signal whenever UV radiation with a fluence above a predetermined value is incident on the UV detector. On the other hand, the RF detector will output a cancel signal whenever it receives an RF component transmitted in an electrical arc discharge having an intensity above a predetermined threshold. The event signal and the cancel signal are then individually and collectively evaluated by a computer to distinguish between an actual open flame and a non-flame event, such as an electric arc discharge (e.g. lightening, electric motors and arc welding).

19 Claims, 2 Drawing Sheets

FLAME DETECTOR

This application claims the benefit of U.S. Provisional Patent Application Ser. No. 61/813,591, filed Apr. 18, 2013. The entire contents of Application Ser. No. 61/813,591 are hereby incorporated by reference herein.

FIELD OF THE INVENTION

The present invention pertains generally to flame detectors. More particularly, the present invention pertains to outdoor flame detectors. The present invention is particularly, but not exclusively, useful as a flame detector for use in a technically challenging environment.

BACKGROUND OF THE INVENTION

Flame detectors are often used to detect the presence of a flame at installations where flammable and combustible materials are used, stored or dispensed. Early flame detection at these installations can prevent substantial installation damage and/or loss of life by allowing the flames to be quickly extinguished before they are able to spread. In this regard, optical sensors can be employed to detect certain characteristic light frequencies that are emitted by the flames. Oftentimes, these installations are outdoors and can be relatively large in terms of the total area that must be monitored.

The outdoor monitoring of flames can present certain difficulties. For one, flame sensors are relatively sensitive. They can be fragile, and in all instances they must be protected from the elements including rain, cold, ice, snow, and frost. In addition, the sensors should be masked from extraneous ultraviolet (UV) sources that could cause a false alarm. Moreover, when more than one sensor is used to monitor a target area, the UV sensors themselves can be a source of false alarms. More specifically, the detection mechanism for certain types of UV sensors can cause UV light to be emitted by that sensor. For example, if a UV sensor is falsely triggered by a cosmic ray or some other non-flame source, UV light may be emitted by the triggered sensor and the emitted UV light may be detected by another sensor. This other sensor, in turn, could then emit UV light that feeds back to the original falsely triggered sensor. This positive feedback (i.e. self-feeding) effect may then continue until the flame sensor system mistakenly identifies the event as a fire.

Other sources of non-flame UV, including lightning and other electrical arc discharges such as arc welding and electrical motors, can also cause false readings. Stated another way, conventional flame sensors often react the same way to both non-flame related UV and flame related UV. Heretofore, the typical method for suppressing false alarms from lightning was to set the electronic monitor with a delay that would sound an alarm only when a signal from the UV sensor is received for a longer period than a lightning event, e.g. 10 seconds. This period, however, can be too long when protecting highly volatile material.

Another factor that must be considered when detecting flames outdoors involves the relative long distances that are associated with outdoor monitoring. Conventional UV detectors have limited range, and heretofore, the only solution to this deficiency was the costly approach of adding more sensors to the monitoring system to thereby ensure that the entire area of interest was properly covered.

In light of the above, it is an object of the present invention to provide an outdoor flame detector that is protected in its operational environment from adverse factors that include severe thermal, structural and hydrological conditions. Another object of the present invention is to provide an outdoor flame detector that is capable of distinguishing between an actual open flame and a non-flame event, such as an electric arc discharge (e.g. lightening, electric motors and arc welding). Still another object of the present invention is to provide a flame detector that is easy to use, relatively simple to implement and comparatively cost effective.

SUMMARY OF THE INVENTION

In accordance with the present invention, a system and method are provided for detecting open flames in an outdoor environment. Structurally, the outdoor flame detector of the present invention includes both an ultra-violet (UV) detector and a Radio Frequency (RF) detector. While operating within predetermined parameters, these detectors respectively create an event signal(s) and a cancel signal(s). In detail, the UV detector will output an event signal whenever UV radiation with a fluence above a predetermined value is incident on the UV detector. On the other hand, the RF detector will output a cancel signal whenever it receives an RF component in the transmission of an electrical arc discharge having an intensity above a predetermined threshold. The event signal and the cancel signal are then individually and collectively evaluated by a computer.

Pursuant to a computer evaluation of the outputs from the UV detector and/or the RF detector, when the computer receives only an event signal from the UV detector, the system reacts with an alarm to indicate a flame event. On the other hand, when both an event signal from the UV detector and a cancel signal from the RF detector are received simultaneously, the event signal is negated by the cancel signal. In this latter case, the system treats the circumstance as a non-flame event.

As a protective feature for the present invention, the UV detector includes a hollow, transparent tube that is dimensioned to receive and surround an optical sensor. It is this optical sensor that is responsive to UV radiation. Also included in the UV detector is a self-regulating heater that is mounted in contact with an end of the tube. For purposes of the present invention, the heater is powered to maintain the tube at an operational temperature, within a predetermined temperature range, to prevent adverse moisture effects on the tube, such as fogging or ice build-up. Additionally, a housing is engaged with the tube to support the optical sensor inside the tube. Importantly, the housing protectively encloses the tube and it is formed with an aperture that allows UV radiation from an external source to pass through the aperture for incidence on the optical sensor in the tube. In its combination with the tube, the housing also establishes a stand-off gap between the housing and a majority of the outer surface area of the tube to provide added insulation for the optical sensor.

The UV detector also includes a controller that is electronically connected with the optical sensor, and with the heater. With these connections, the controller of the UV detector manages the operation of the optical sensor, and it maintains the operational temperature of the tube. As implied from the above, UV radiation with a fluence that is in excess of a predetermined fluence level will trigger an event signal when it is incident on the optical sensor.

Unlike the UV detector, the RF detector of the present invention includes an electro-magnetic sensor that is responsive to specific Radio Frequency (RF) components. In particular, the RF components of interest for the present invention are those that are transmitted in an electrical arc discharge, and are within an approximate range between 200 kHz and 2 MHz. Accordingly, the electro-magnetic sensor can be a simple, well known amplitude modulated radio receiver that is enclosed within a faraday cage. With this combination, an antenna is extended from the electro-magnetic sensor to outside the faraday cage. Thus, only the antenna is responsive to the RF component in an electric arc discharge. For this purpose, the antenna is customized with a predetermined length L that is established to receive RF components having intensities which are above a predetermined threshold. Specifically, this is done in order for the system to ignore harmless electric arc discharge from short range sources such as arc welders and electric motors.

Similarly to the UV detector, the RF detector includes its own controller. This controller is electronically connected to the electro-magnetic sensor. Specifically, the function of the controller that is connected with the RF detector is to monitor its operation and to create a cancel signal upon receipt of an appropriate RF component.

Additional features of a system in accordance with the present invention include an optical magnifier that can be positioned relative to the optical sensor to increase the fluence of the UV radiation that is incident on the optical sensor. Also, although the optical sensor will typically have a Field of View (FOV) that extends through a horizontal arc of approximately one hundred ten degrees (110°), this capability can be enhanced by employing a mechanism for rotating the optical sensor through an arc of $\phi$ degrees. If employed, such a mechanism makes it possible to scan the FOV of the optical sensor through an arc of $(110+\phi)°$.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
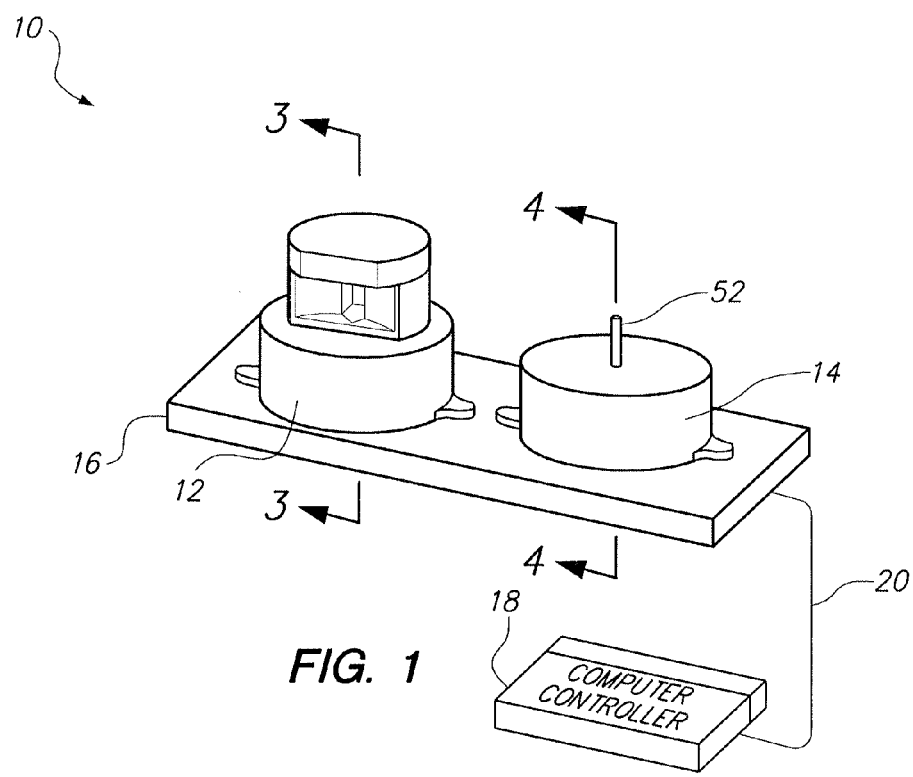
FIG. 1 is a perspective view of a flame sensing unit in accordance with the present invention.

In accordance with the present invention, a unit for detecting open flames in an outdoor environment is shown in FIG. 1 and generally designated 10. As shown, the unit 10 includes an ultra-violet (UV) detector 12 and a Radio Frequency (RF) detector 14 that are mounted on a common base 16. It can also be seen that the unit 10 includes a computer/controller 18 that is operationally coupled to the ultra-violet (UV) detector 12 and the Radio Frequency (RF) detector 14 via line 20. In functional overview, the UV detector 12 is configured to output an event signal to the computer/controller 18 whenever UV radiation with a fluence above a predetermined value is incident on the UV detector 12. Also, the RF detector 14 is configured to output a cancel signal to the computer/controller 18 whenever it receives an RF component in the transmission of an electrical arc discharge having an intensity above a predetermined threshold. As described in further detail below, the event signal and the cancel signal are then individually and collectively evaluated by the computer/controller 18 to distinguish between an actual open flame and a non-flame event, such as an electric arc discharge (e.g. lightening, electric motors and arc welding).

Figure 2:
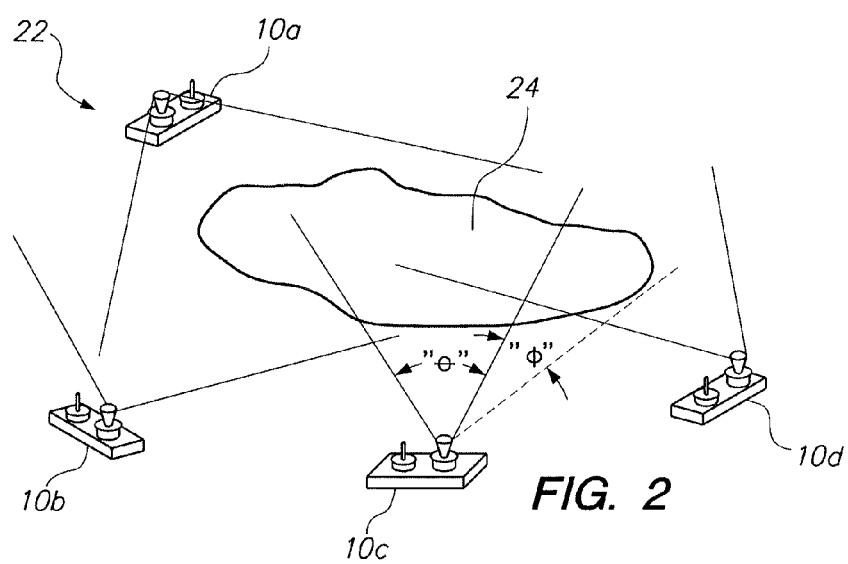
FIG. 2 is a schematic presentation of an array of flame sensing units positioned to monitor a same target area.

FIG. 2 shows a system (generally designated system 22) having a plurality of flame detection units 10a-10d that are arranged to monitor an outdoor target area 24. Although four flame detection units 10a-10d are shown for the system 22, it is to be appreciated that more than four and as few as one flame detection units 10a-10d may be used, depending on the size and complexity of the target area 24.

Figure 3:
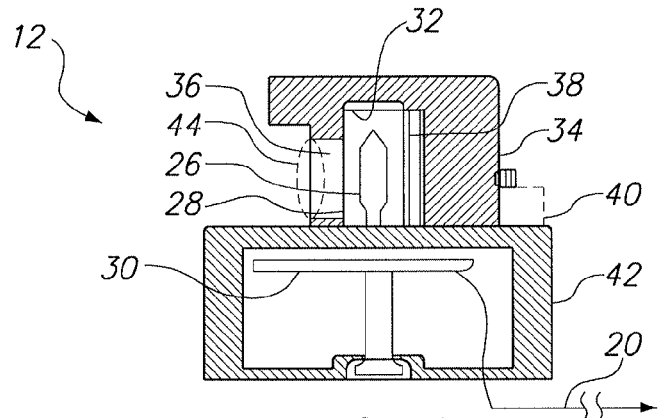
FIG. 3 is a cross-section view of an optical sensor in accordance with the present invention as seen along the line 3-3 in FIG. 1.

FIG. 3 shows a representative UV detector 12 in more detail. As seen there, the UV detector 12 can include an optical sensor 26 that is positioned within a hollow, transparent tube 28. For example, the optical sensor 26 may be a standard, high voltage UV sensor driven by a voltage of 400 VDC or more. Circuitry in the UV control circuit 30 can include a voltage multiplier converting a low voltage input, e.g. 3V, into the high voltage, e.g. 400 VDC needed for UV sensor operation. With this arrangement, each of the flame detection units 10a-10d of the system 22 shown in FIG. 2 can be connected using a relatively low voltage, power/communication line, such as a single twisted pair. For the UV detector 12, the hollow, transparent tube 28 can be made of a material such as quartz that is transparent to the UV wavelengths of interest.

Continuing with reference to FIG. 3, it can be seen that the UV detector 12 includes a self-regulating heater 32 having an associated ambient temperature sensor that is mounted in contact with an end of the tube 28. For example, the heater 32 can be a so-called 'positive temperature coefficient,' or PTC type, heater. In use, the heater 32 is powered to maintain the tube 28 at an operational temperature, and within a predetermined temperature range, to prevent adverse moisture effects on the tube 28, such as fogging or ice build-up.

FIG. 3 also shows that the UV detector 12 can include a weather resistant housing 34 that is engaged with the tube 28 to support the optical sensor 26 inside the tube 28. For example, the housing 34 can be made of a plastic, such as Delrin, which is mechanically stable and resists heat transfer and degradation from UV radiation. As shown, the housing 34 protectively encloses the tube 28 and it is formed with an aperture 36 that allows UV radiation from an external source, e.g. a detected flame, to pass through the aperture 36 for incidence on the optical sensor 26 in the tube 28. FIG. 3 also shows that a stand-off gap 38 can be established between the housing 34 and a majority of the outer surface area of the tube 28 to provide added insulation for the optical sensor 26.

Cross-referencing FIGS. 2 and 3, it can be seen that the aperture 36 establishes a Field of View (FOV) that extends through a horizontal arc, $\theta$, shown in FIG. 3. Typically, the aperture 36 is sized to establish a horizontal Field of View (FOV) of approximately one hundred ten degrees (110°) and a vertical Field of View (FOV) of approximately one hundred sixty degrees (160°). The horizontal Field of View can be enhanced by employing a mechanism, such as motor 40 shown in FIG. 3, for selectively rotating the housing 34, aperture 36 and sensor 26 through an arc of $\phi$ degrees (see FIG. 2) relative to the UV detector base member 42. If employed, such a mechanism makes it possible to scan the horizontal FOV of the optical sensor 26 through an arc of $(110+\phi)°$. The horizontal and vertical FOVs and the relative arrangement of multiple flame detector units 10a-d can be established, in some cases, to prevent interaction between the flame detector units 10*a*-*d* (see FIG. 2).

FIG. 3 also shows that an optional optical magnifier, such as a sapphire lens 44 (or, alternatively, a parabolic mirror (not shown)) can be positioned relative to the optical sensor 26 to increase the fluence of the UV radiation that is incident on the optical sensor 26. For example, the active area of the optical UV sensor 26 may be about 1 cm by 1 cm. For this case, a 10 cm lens can be used to increase the sensor's effective area, and thus its sensitivity/range, by about two orders of magnitude, with a commensurate decrease in FOV.

For the UV detector 12, the UV control circuit 30 is electronically connected with the optical sensor 26, and with the heater 32. With these connections, the UV control circuit 30 manages the operation of the optical sensor 26, and it maintains the operational temperature of the tube 28. As implied from the above, UV radiation with a fluence that is in excess of a predetermined fluence level will trigger an event signal that is output on line 20 for processing by the system computer/controller 18 (shown in FIG. 1).

Figure 4:
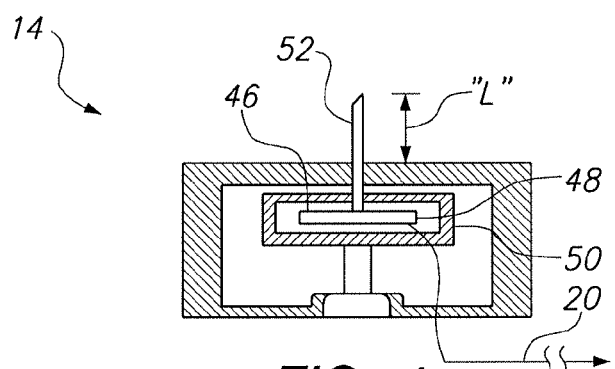
FIG. 4 is a cross-section view of an electro-magnetic sensor in accordance with the present invention as seen along the line 4-4 in FIG. 1.

FIG. 4 shows a representative RF detector 14 in more detail. Functionally, the RF detector 14 includes an electromagnetic sensor 46 that is responsive to specific Radio Frequency (RF) components. In particular, the RF components of interest for the present invention are those that are transmitted in an electrical arc discharge, and are within an approximate range between 200 kHz and 2 MHz. As shown in FIG. 4, the RF detector 14 can include an RF control/radio circuit 48, that is enclosed within a faraday cage 50. For example, the RF control/radio circuit 48 may include a simple, amplitude modulated radio receiver. Also show, an antenna 52 is extended from the RF control/radio circuit 48 to outside the faraday cage 50. Thus, only the antenna 52 is responsive to the RF component in an electric arc discharge. For this purpose, the antenna 52 is customized with a predetermined length L such that only RF components having intensities which are above a predetermined threshold are received. Because the sensitivity of the RF detector 14 is established by the antenna length L, electronic/software adjustments are not typically required. Generally, the established length L is shorter than a standard antenna employed in a standard radio. Specifically, this is done in order for the RF detector 14 to ignore harmless electric arc discharge from short range sources such as arc welders and electric motors.

For the RF detector 14 shown in FIG. 4, the RF control/radio circuit 48 is electronically connected to the electro-magnetic sensor 46. Specifically, the function of the controller portion of the RF control/radio circuit 48 is to monitor its operation and, upon receipt of an appropriate RF component, to create a cancel signal that is output on line 20 to the system computer/controller 18 (shown in FIG. 1).

Figure 5:
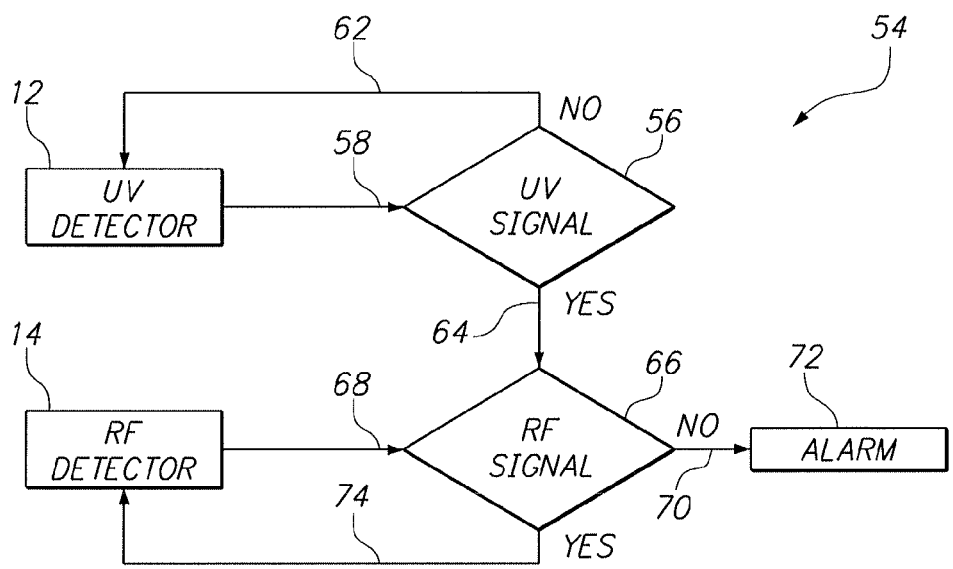
FIG. 5 is a logic flow chart for an operation of a flame sensing unit whereby electrical arc discharges are eliminated from consideration as a potential flame source by the present invention.

FIG. 5 shows a logic flow chart (generally designated chart 54) for an operation of a flame sensing unit, such as flame sensing unit 10 shown in FIG. 1. As shown in comparator Box 56 of FIG. 5, the computer/controller 18 (FIG. 1) determines whether an event signal has been output (arrow 58) from UV detector 12. If there is no event signal in the UV detector output, then according to arrow 58, the comparator Box 56 continues to monitor the output of the UV detector 12 (arrow 62). On the other hand, if an event signal is present in the UV detector output, then according to arrow 62, the comparator Box 56 outputs a YES signal (arrow 64) to comparator Box 66. Comparator Box 66 receives the YES signal and checks to determine whether a cancel signal is present in the output (arrow 68) of RF detector 14 indicating that the RF detector 14 has received an RF component generated by an electrical arc discharge. If there is no cancel signal in the RF detector output, then according to arrow 70, the comparator Box 66 outputs a signal to alarm 72 indicating the presence of a flame. On the other hand, if a cancel signal is present in the RF detector output, then comparator Box 66 determines that an event signal from the UV detector 12 and a cancel signal from the RF detector 14 have been received simultaneously. The comparator Box 66 then negates the event signal and treats the circumstance as a non-flame event. In this case, no alarm signal is generated. Instead, according to arrow 74, the comparator Box 66 then continues to monitor outputs from the RF detector 14.

While the particular flame detector as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A flame sensing unit which comprises:
   an optical sensor for creating an event signal, wherein the event signal is indicative of a flame and is created whenever ultra-violet (UV) radiation is incident on the sensor and the incident UV radiation exceeds a predetermined fluence;
   an electro-magnetic sensor for creating a cancel signal in response to the reception of a Radio Frequency (RF) component transmitted in an electrical arc discharge;
   an antenna electrically connected to the electro-magnetic sensor for receiving the RF component of the electrical arc discharge, wherein the antenna has a predetermined length L, and the length L is established to receive RF components having an intensity above a predetermined threshold;
   a controller electronically connected to the electro-magnetic sensor for monitoring an operation of the electro-magnetic sensor for creation of the cancel signal;
   a computer connected to the optical sensor for receiving the event signal therefrom, and connected to the controller of the electro-magnetic sensor for receiving the cancel signal therefrom, and for stopping the event signal when the event signal and a cancel signal are received simultaneously by the computer; and
   an alarm connected to the computer for indicating the presence of a flame when the alarm receives an event signal.

2. A unit as recited in claim 1 further comprising:
   a hollow, transparent tube having a first end and a second end with a lumen extending therebetween, wherein the lumen of the tube is dimensioned for receiving the optical sensor therein;
   a self-regulating heater mounted on the first end of the tube for maintaining the tube at an operational temperature, wherein the operational temperature is in a predetermined temperature range and is established to prevent moisture effects on the tube;
   a housing engaged with the first end of the tube and with the second end of the tube to support the sensor in the tube, wherein the housing protectively encloses the tube and is formed with an aperture to allow UV radiation from an external source to pass through the aperture for incidence on the optical sensor in the tube; and
   a controller electronically connected with the optical sensor and with the heater, to manage operation of the optical sensor and to maintain the operational temperature of the tube for sensing UV radiation indicative of a flame.

3. A unit as recited in claim 2 further comprising a faraday cage for surrounding the electro-magnetic sensor.

4. A unit as recited in claim 2 wherein the electro-magnetic sensor is an amplitude modulated radio receiver.

5. A unit as recited in claim 2 wherein the RF component of the electrical arc discharge is in an approximate range between 200 kHz and 2 MHz.

6. A unit as recited in claim 2 further comprising an optical magnifier positioned relative to the optical sensor to increase the fluence of the UV radiation incident on the optical sensor.

7. A unit as recited in claim 2 wherein the controller of the optical sensor includes a DC to DC multiplier for providing the optical sensor with an activation voltage of approximately 400 volts.

8. A unit as recited in claim 2 wherein the tube has an outer surface area and the housing establishes a stand-off gap between the housing and a majority of the outer surface area of the tube.

9. A unit as recited in claim 2 wherein the optical sensor has a Field of View (FOV) within a horizontal arc of approximately one hundred ten degrees (110°).

10. A unit as recited in claim 9 further comprising a means for rotating the optical sensor through an arc of φ degrees to scan the FOV through an arc of (110+φ)°.

11. A system for sensing flames which comprises:
an ultra-violet (UV) detector for creating an event signal, wherein the event signal is indicative of a flame and is created whenever ultra-violet (UV) radiation is incident on the detector, and the incident UV radiation exceeds a predetermined fluence;
a Radio Frequency (RF) detector for creating a cancel signal in response to the reception of a Radio Frequency (RF) component transmitted in an electrical arc discharge;
a computer connected to the controller of the optical sensor for receiving the event signal therefrom, and connected to the controller of the electro-magnetic sensor for receiving the cancel signal therefrom, and for stopping the event signal when the event signal and a cancel signal are received simultaneously by the computer; and
an alarm connected to the computer for indicating the presence of a flame when the alarm receives an event signal.

12. A system as recited in claim 11 wherein the UV detector comprises:
an optical sensor;
a hollow, transparent tube having a first end and a second end with a lumen extending therebetween, wherein the lumen of the tube is dimensioned for receiving the sensor therein;
a self-regulating heater mounted on the first end of the tube for maintaining the tube at an operational temperature, wherein the operational temperature is in a predetermined temperature range and is established to prevent moisture effects on the tube;
a housing engaged with the first end of the tube and with the second end of the tube to support the sensor in the tube, wherein the housing protectively encloses the tube and is formed with an aperture to allow UV radiation from an external source to pass through the aperture for incidence on the optical sensor in the tube; and
a controller electronically connected with the optical sensor and with the heater to manage operation of the optical sensor and to maintain the operational temperature of the tube for sensing UV radiation indicative of a flame.

13. A system as recited in claim 12 wherein the optical sensor has a Field of View (FOV) within a horizontal arc of approximately one hundred ten degrees (110°).

14. A system as recited in claim 11 wherein the RF detector comprises:
an electro-magnetic sensor;
an antenna electrically connected to the electro-magnetic sensor for receiving the RF component of the electrical arc discharge, wherein the antenna has a predetermined length L, and the length L is established to receive RF components having an intensity above a predetermined threshold; and
a controller electronically connected to the electro-magnetic sensor for monitoring an operation of the electro-magnetic sensor for creation of the cancel signal.

15. A system as recited in claim 14 wherein the electro-magnetic sensor is an amplitude modulated radio receiver surrounded by a faraday cage, and wherein the RF component of the electrical arc discharge is in an approximate range between 200 kHz and 2 MHz.

16. A system as recited in claim 11 wherein the system is positioned with at least one other system to create an array of systems for monitoring a target area.

17. A system as recited in claim 11 further comprising an optical magnifier positioned relative to the UV detector to increase the fluence of the UV radiation incident on the UV detector.

18. A method for sensing flames which comprises the steps of:
creating an event signal using an ultra-violet detector having an optical sensor, wherein the event signal is indicative of a flame and is created whenever ultra-violet (UV) radiation is incident on the optical sensor, and the incident UV radiation exceeds a predetermined fluence;
creating a cancel signal using a Radio Frequency (RF) detector having an electro-magnetic sensor, wherein the cancel signal is created in response to the reception by the electro-magnetic sensor of a Radio Frequency (RF) component transmitted in an electrical arc discharge;
using a computer for receiving the event signal and for receiving the cancel signal;
stopping the event signal when an event signal and a cancel signal are received simultaneously by the computer; and
providing an alarm for indicating the presence of a flame when the alarm receives an event signal.

19. A method as recited in claim 18 further comprising the step of protecting the ultra-violet detector with a unit comprising:
a hollow transparent tube having a first end and a second end with a lumen extending therebetween, wherein the lumen of the tube is dimensioned for receiving the optical sensor therein;
a self-regulating heater mounted on the first end of the tube for maintaining the tube at an operational temperature, wherein the operational temperature is in a predetermined temperature range and is established to prevent moisture effects on the tube; and
a housing engaged with the first end of the tube and with the second end of the tube to support the optical sensor in the tube, wherein the housing protectively encloses the tube and is formed with an aperture to allow UV radiation from an external source to pass through the aperture for incidence on the optical sensor in the tube.

* * * * *